(12) United States Patent
Horng

(10) Patent No.: US 9,752,594 B2
(45) Date of Patent: Sep. 5, 2017

(54) CEILING FAN MOTOR WITH COOLING AIR CHANNEL

(71) Applicant: Sunonwealth Electric Machine Industry Co., Ltd., Kaohsiung (TW)

(72) Inventor: Alex Horng, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 427 days.

(21) Appl. No.: 14/525,377

(22) Filed: Oct. 28, 2014

(65) Prior Publication Data

US 2015/0176602 A1 Jun. 25, 2015

(30) Foreign Application Priority Data

Dec. 24, 2013 (TW) .............................. 102148026 A

(51) Int. Cl.
*H02K 5/20* (2006.01)
*F04D 29/58* (2006.01)
*F04D 25/08* (2006.01)
*H02K 9/06* (2006.01)

(52) U.S. Cl.
CPC ....... *F04D 29/5806* (2013.01); *F04D 25/088* (2013.01); *H02K 5/20* (2013.01); *H02K 9/06* (2013.01)

(58) Field of Classification Search
CPC ..... F04D 29/5806; F04D 25/088; H02K 5/20; H02K 9/04; H02K 9/02; H02K 1/187; H02K 3/522; H02K 9/06

USPC ........................................ 310/58, 60 A, 60 R
See application file for complete search history.

(56) References Cited

U.S. PATENT DOCUMENTS

| 5,883,449 A | * | 3/1999 | Mehta | ...................... | H02K 9/06 310/60 R |
| 2010/0109465 A1 | | 5/2010 | Yang et al. | | |
| 2013/0278094 A1 | * | 10/2013 | Peterson | ................ | H02K 1/187 310/64 |

FOREIGN PATENT DOCUMENTS

| CN | 201865944 U | * | 6/2011 | ............... H02K 1/12 |
| TW | 525712 U | | 3/2003 | |
| TW | M354002 U | | 4/2009 | |

OTHER PUBLICATIONS

Machine translation of CN 201865944 U (Jun. 2011).*

* cited by examiner

*Primary Examiner* — Michael Andrews
(74) *Attorney, Agent, or Firm* — Alan D. Kamrath; Kamrath IP Lawfirm, P.A.

(57) ABSTRACT

A motor of a ceiling fan includes a stator, a rotor, and a base. The stator has a shaft and a core. The rotor has a first housing rotatably coupling with the shaft. The base has a second housing firmly connecting with the stator. The core of the stator is positioned between the first and second housings, an air channel communicates the inside and the outside of the motor, and the first housing is able to rotate relative to the second housing for generating an air current inside the motor and guiding the air current out of the motor via the air channel.

9 Claims, 5 Drawing Sheets

CEILING FAN MOTOR WITH COOLING AIR CHANNEL

BACKGROUND OF THE INVENTION

1. Field of the Invention

The present invention generally relates to a motor of a ceiling fan and, more particularly, to a motor equipped with a core arranged between a rotatable first housing and a steady second housing with the first housing capable of rotating relative to the second housing.

2. Description of the Related Art

Referring to FIG. 1, a conventional motor of a ceiling fan with a reference number of "9" of Taiwan publication number M354002 entitled "Motor of Ceiling Fan" is shown as including a stator 91, a rotor 92, and a controller 93. The stator 91 has a shaft 911, a core 912 coupled around the shaft 911, and a plurality coils 913 surrounding the core 912. The rotor 92 is rotatably coupled around the shaft 911 and has an upper shield 921, a lower shield 922 and a waist ring 923 sandwiched by the upper and lower shields 921, 922. The upper and lower shields 921, 922 are positioned on two opposite sides of the core 912. The controller 93 includes a circuit board 931 and a housing 932 receiving the circuit board 931.

Since the upper shield 921, the lower shield 922 and the waist ring 923 seal the stator 91 jointly, it is difficult to dispel the heat generated by the core 912 and coils 913 in operation from the stator 91. As a result, the stator 91 is continuously kept at a high temperature in operation, which results in negative effects to the performance and lifetime of the conventional motor 9 and also induces increased operational currents. Moreover, even though there may be some apertures in the upper shield 921, the lower shield 922 or the waist ring 923 for cooling purposes, it is not easy to generate airflows in the motor 9 for air inside and outside the rotor 92 to exchange due to the simultaneous rotation among the upper shield 921, the lower shield 922 and the waist ring 923. Consequently, the internal air of the rotor 92 cannot sufficiently exchange with the external air, and the heat generated by the core 912 and the coils 913 still remains in the motor 9 without being properly expelled via the apertures. The inadequate heat dissipation mechanism will lead to the accumulation of heat inside the motor 9, which further causes the malfunction of the motor 9, shortens the service life of the motor 9, and increases the power consumption of the motor 9.

In addition to the stator 91, electronic elements of the circuit board 931 usually also generate heat in operation. Although the circuit board 93.1 is arranged outside of the stator 91 and rotor 92 to avoid heat accumulation, the housing 932 for receiving and being connected by the circuit board 931 largely increases the size of the motor 9.

As a result, since the conventional motor 9 for a ceiling fan has drawbacks such as "bad performance in cooling" and "large size," it is necessary to improve the conventional motor 9.

SUMMARY OF THE INVENTION

It is therefore the objective of this invention to provide a motor of a ceiling fan, which has a core of a stator disposed between a rotatable first housing and a steady second housing, with a through hole formed in the first housing or the second housing, to improve cooling performance.

Another objective of this invention is to provide a motor of a ceiling fan, which generates a cooling airflow via the relative rotation between the first and second housings, dispels the heat via the through hole formed in the first housing or the second housing, and disposes a circuit board between the first and second housings, to decrease the size of the motor.

One embodiment of the invention discloses a motor of a ceiling fan, which includes a stator, a rotor, and a base. The stator has a shaft and a core. The rotor has a first housing rotatably coupling with the shaft. The base has a second housing firmly connecting with the stator. The core of the stator is positioned between the first and second housings, an air channel communicates the inside and the outside of the motor, and the first housing is able to rotate relatively to the second housing for generating an air current inside the motor and guiding the air current out of the motor via the air channel.

In a preferred form shown, the air channel has a through hole in the second housing of the base, and the through hole penetrates the second housing to link the inside and outside of the motor.

In the preferred form shown, a circuit board is disposed inside the second housing.

In the preferred form shown, the first housing has an inner room inside for receiving the core.

In the preferred form shown, a permanent magnet module is mounted in and coupled with the first housing, and the permanent magnet module is received in the inner room and has a pole face facing the core.

In the preferred form shown, a blade is arranged on an inner surface of the first housing, and the inner surface faces the inner room.

In the preferred form shown, the air channel has a through hole in the first housing of the rotor, and the through hole penetrates the first housing to link the inside and outside of the motor.

In the preferred form shown, a blade is arranged on the first housing and connects with an edge of the through hole.

In the preferred form shown, the air channel includes a gap between the first housing of the rotor and the second housing of the base, and the gap communicates the inside and outside of the motor.

In the preferred form shown, the core firmly couples with the shaft.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
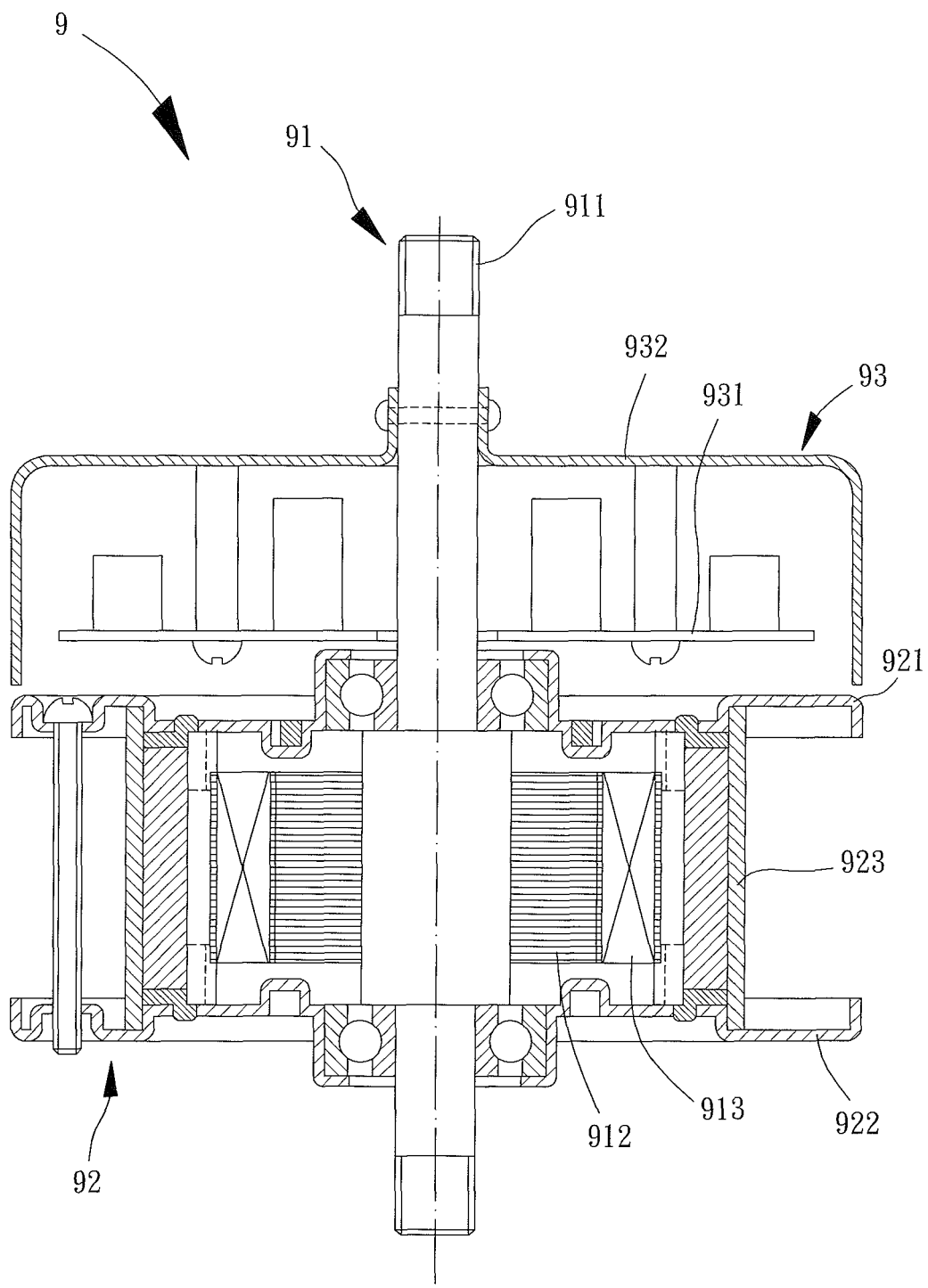
FIG. 1 is a cross-sectional view of a conventional motor of a ceiling fan.

In the various figures of the drawings, the same numerals designate the same or similar parts. Furthermore, when the term "first," "second," "inner," "outer," "inside," "outside," "beneath," "above" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
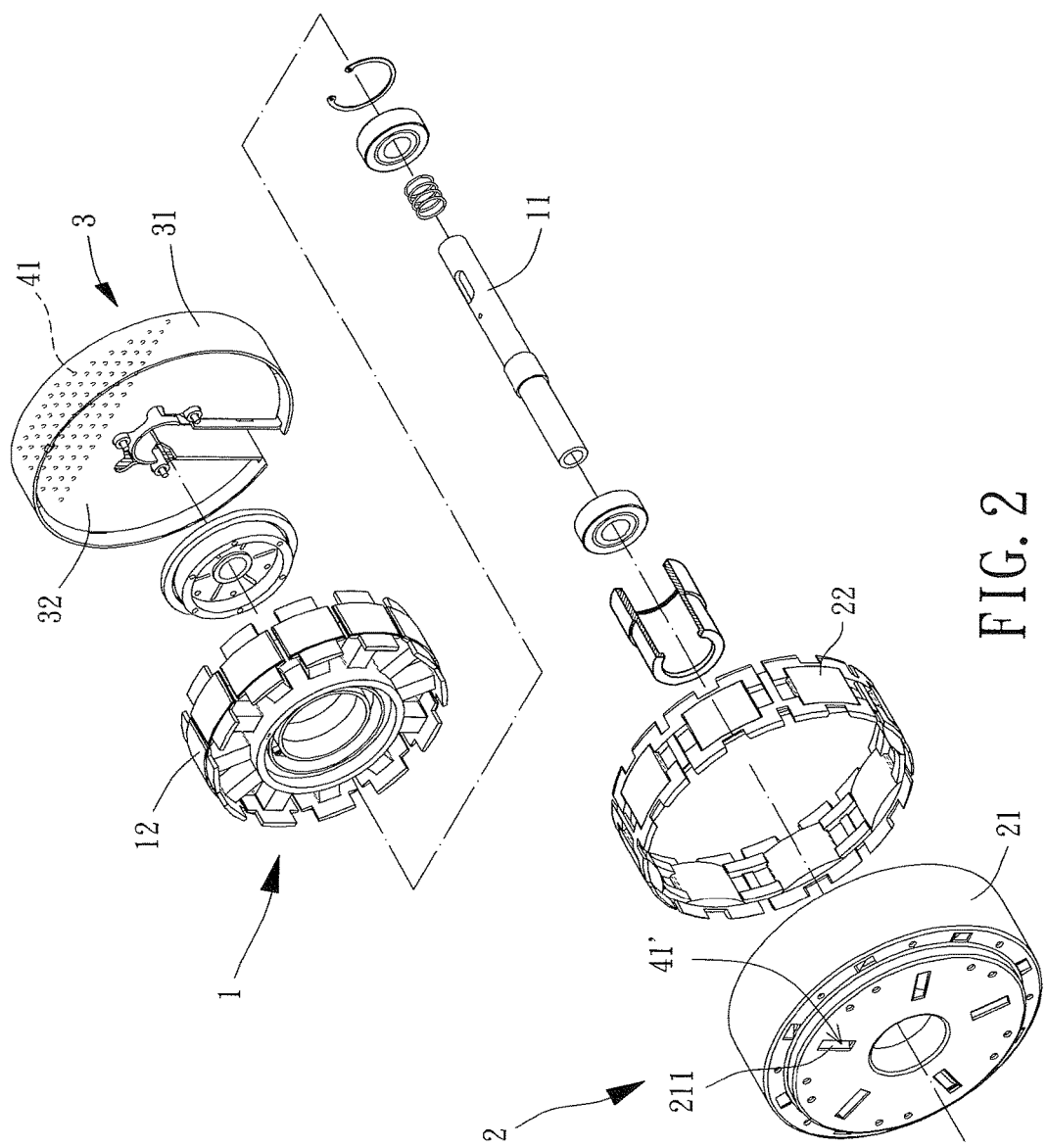
FIG. 2 is an exploded and perspective view of a motor of a ceiling fan according to a first embodiment of the invention.
Figure 3:
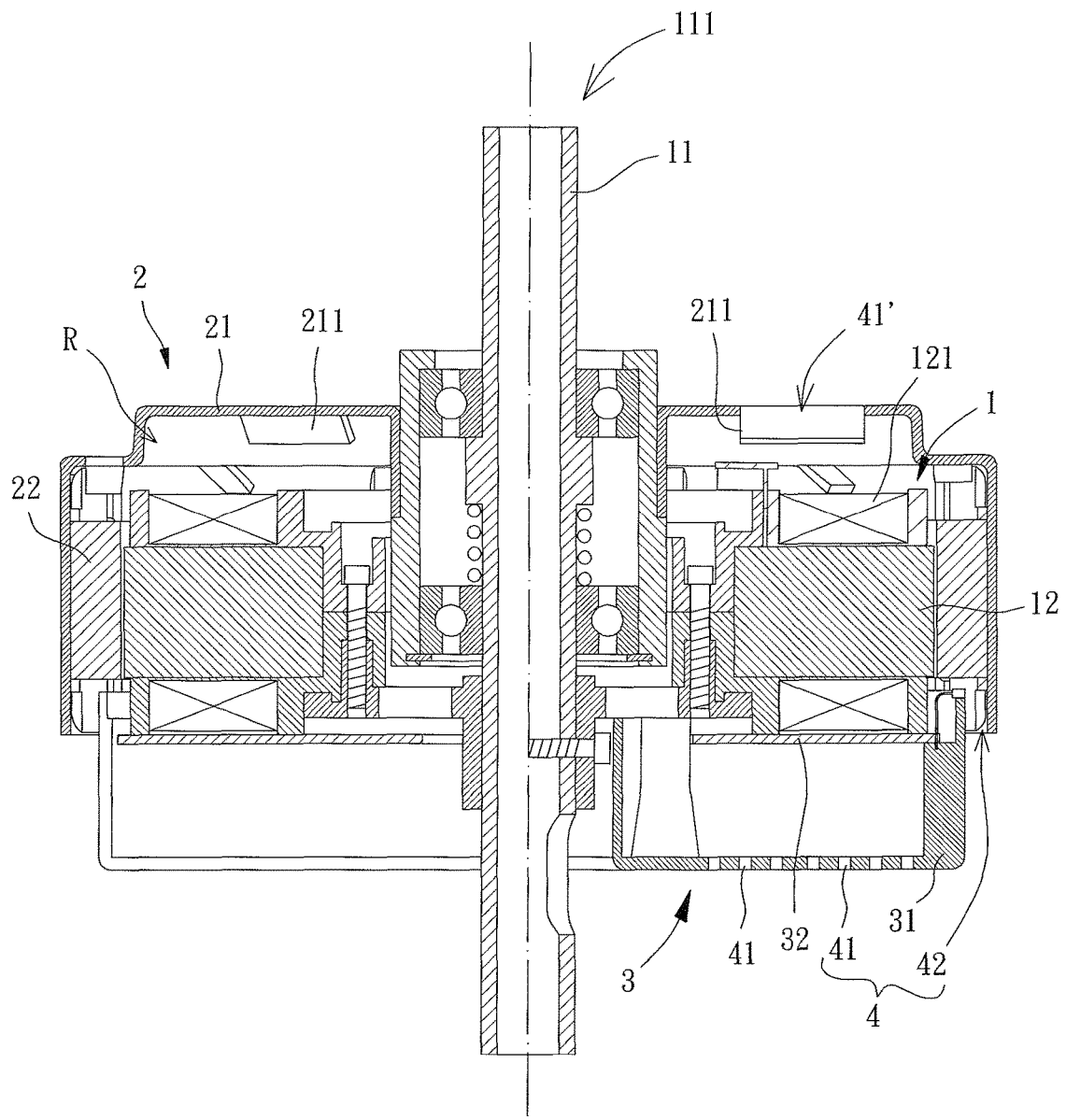
FIG. 3 is a cross-sectional view of the motor according to the first embodiment.

Referring to FIGS. 2 and 3, a first embodiment of a motor of a ceiling fan of the present disclosure is shown. Although the shown motor is an outer-rotor-type motor, this outer-rotor-type motor can be replaced by an inner-rotor-type motor through a conventional modification. The motor of this embodiment includes a stator 1, a rotor 2 rotatably coupling with the stator 1, and a base 3 firmly connecting with the stator 1. An air channel 4 is formed to communicate the inside and the outside of the motor.

The stator 1 has a shaft 11 and a core 12. The shaft 11 has an end 111 adapted to connect with a ceiling, and the core 12 firmly couples with the shaft 11 and is wound by a coil 121. Specifically, the core 12 couples with the shaft 11 directly or via a washer, linking seat or other similar member. The rotor 2 includes a first housing 21 rotatably coupling with the shaft 11, and the first housing 21 has an inner room "R" inside for receiving a permanent magnet module 22 and the core 12. Preferably, the permanent magnet module 22 is mounted on the inner surface of the first housing 21 and has a plurality of pole faces facing and spaced from the core 12 by a gap, and the first housing 21 is adapted to couple with vanes of the ceiling fan.

The base 3 includes a second housing 31 firmly connecting with the stator 1, with the core 12 of the stator 1 positioned between the first and second housings 21, 31. Preferably, the second housing 31 connects with the shaft 11 or core 12 of the stator 1 directly or indirectly by a conventional way such as rabbeting, screwing or hooking. Therefore, the base 3 is firmly connected with the stator 1, and the second housing 31 does not rotate relative to the shaft 11. Additionally, there can be a circuit board 32 inside the second housing 31 to control the operation of the motor.

In this embodiment, the air channel 4 includes a through hole 41 formed in the second housing 31 of the base 3. Specifically, the through hole 41 penetrates the wall of the second housing 31 to connect inner and outer surfaces of the second housing 31. That is, the air channel 4 links the inside and outside of the motor.

With the above disclosed structure, since the core 12 of the stator 1 is positioned between the first and second housings 21, 31, and while the through hole 41 is formed in the wall of the second housing 31 and serves as an air channel, the space in which the core 12 and the circuit board 32 are disposed can communicate with the outside of the motor via the through hole 41. In other words, the core 12 and the circuit board 32 are not hermetically sealed by the first and second housings 21, 31. Therefore, the heat generated by the core 12, the coil 121 and the circuit board 32 is able to be dispelled via the through hole 41. Specifically, when in operation, the stator 1 drives the rotor 2 to rotate, and, thus, the first housing 21 of the rotor 2 rotates about the shaft 11 of the stator 1. On the contrary, the second housing 31 of the base 3 keeps steady in operation, since the second housing 31 firmly connects with the stator 1. As a result, the rotation of the first housing 21 relative to the second housing 31 can easily generate air currents inside the motor, to cool the core 12, the coil 121 and the circuit board 32 by dispelling the hot air out of the motor via the air channel 4. Moreover, in this embodiment, the circuit board 32 can be arranged between the first and second housings 21, 31, since the relative rotation between the first housing 21 of the rotor 2 and the second housing 31 of the base 3 can efficiently dissipate the heat inside the motor.

Furthermore, in addition to the through hole 41 formed in the second housing 31, the air channel 4 can also include another through hole 41' penetrating the wall of the first housing 21 to connect inner and outer surfaces of the first housing 21. Namely, the through hole 41' communicates the inner room "R" and the outside of the motor.

Referring to FIGS. 2 and 3 now, it is preferable that there is a blade 211 formed on or connecting to the first housing 21 of the rotor 2. Specifically, the blade 211 is arranged on the inner surface of the first housing 21, which faces the inner room "R." The blade 211 can be formed on the first housing 21 by die casting or by punching. Preferably, the blade 211 is formed by punching and bending a part of the first housing 21, and the hole formed in the first housing 21 after said part is bent serves as the through hole 41', so that the blade 211 connects with an edge of the through hole 41'. Accordingly, in operation, the blade 211 can easily draw external air into the first housing 21 via the through hole 41', to efficiently generate an air current for cooling the elements inside the motor and then guide the heated air current out of the motor through the through hole 41 of the second housing 31. Moreover, in this embodiment, the air channel 4 may include a gap 42 between the first and second housings 21, 31, which also communicates the inside and outside of the motor, so that the heated air can be dispelled out of the motor by the gap 42 too. Specifically, in use of this motor, the end 111 of the shaft 11 connects with a ceiling, the base 3 is disposed below the ceiling, and the rotor 2 is arranged between the ceiling and the base 3. Namely, the rotor 2 is in an upper position, and the base 3 is in a lower position. In this regard, the blade 211 is able to draw air into the first housing 21 via the through hole 41' during the rotation of the first housing 21 in order to dispel the heat inside the motor. The air exits the motor via the through hole 41 of the second housing 31 or via the gap 42 between the first and second housings 21, 31.

Figure 4:
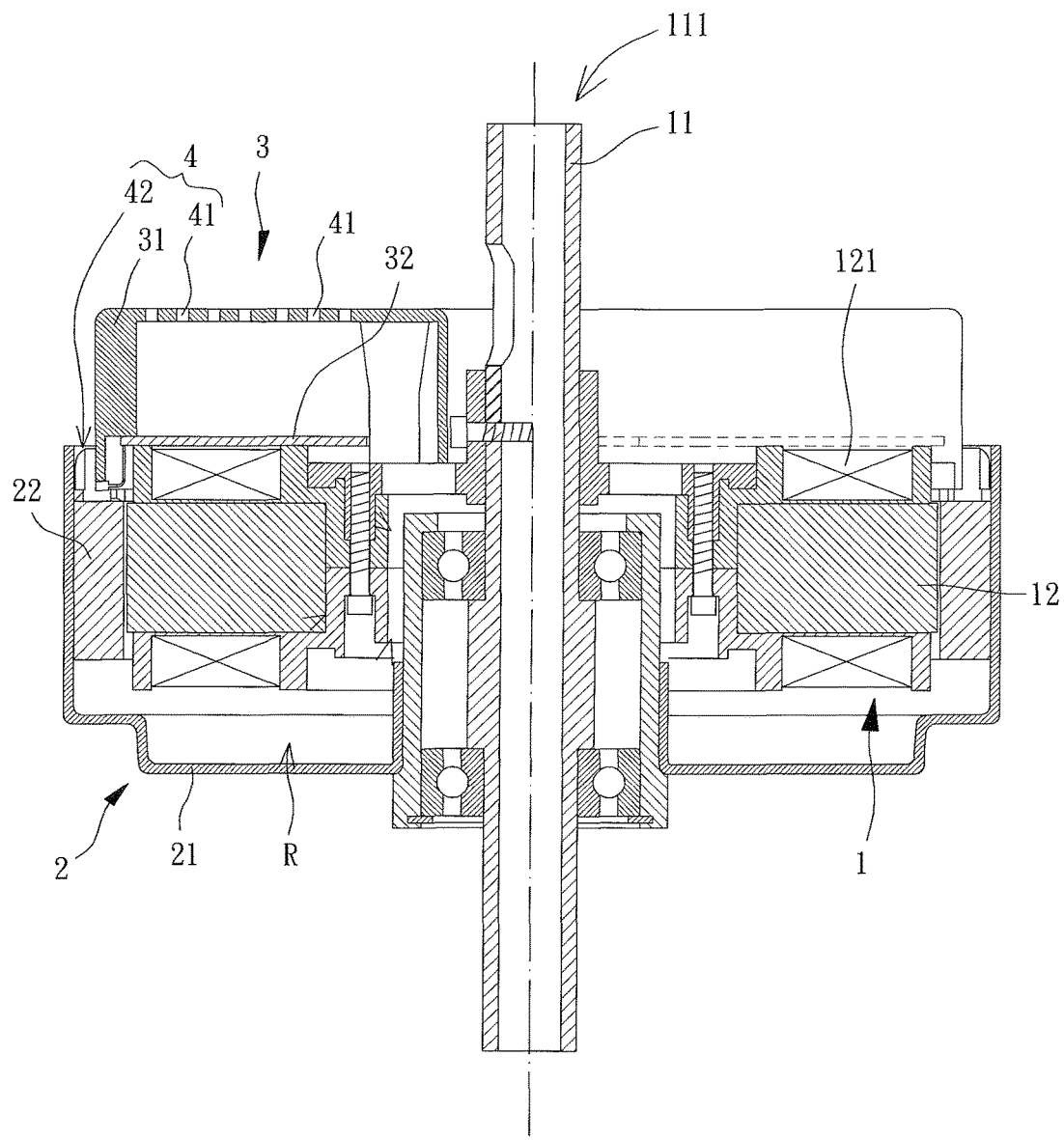
FIG. 4 is a cross-sectional view of the motor according to the second embodiment.

Referring to FIG. 4, a second embodiment of a motor of a ceiling fan of the present disclosure is shown. The difference between this embodiment and the previous embodiment lies in that the end 111 of the shaft 11 is closer to the base 3 than to the rotor 2. Namely, in use, the base 3 is in the upper position, and the rotor 2 is in the lower position. Accordingly, since hot air inside the motor raises automatically while external cold air is able to enter into the motor, the through hole 41 of the base 3 in the upper position is quite enough for heat dissipation, and, thus, the through hole 41' of the first housing 21, the blade 211, and the step for forming them are omitted. Therefore, in comparison with the previous embodiment, the motor of this embodiment can be made by fewer steps and lower cost.

Figure 5:
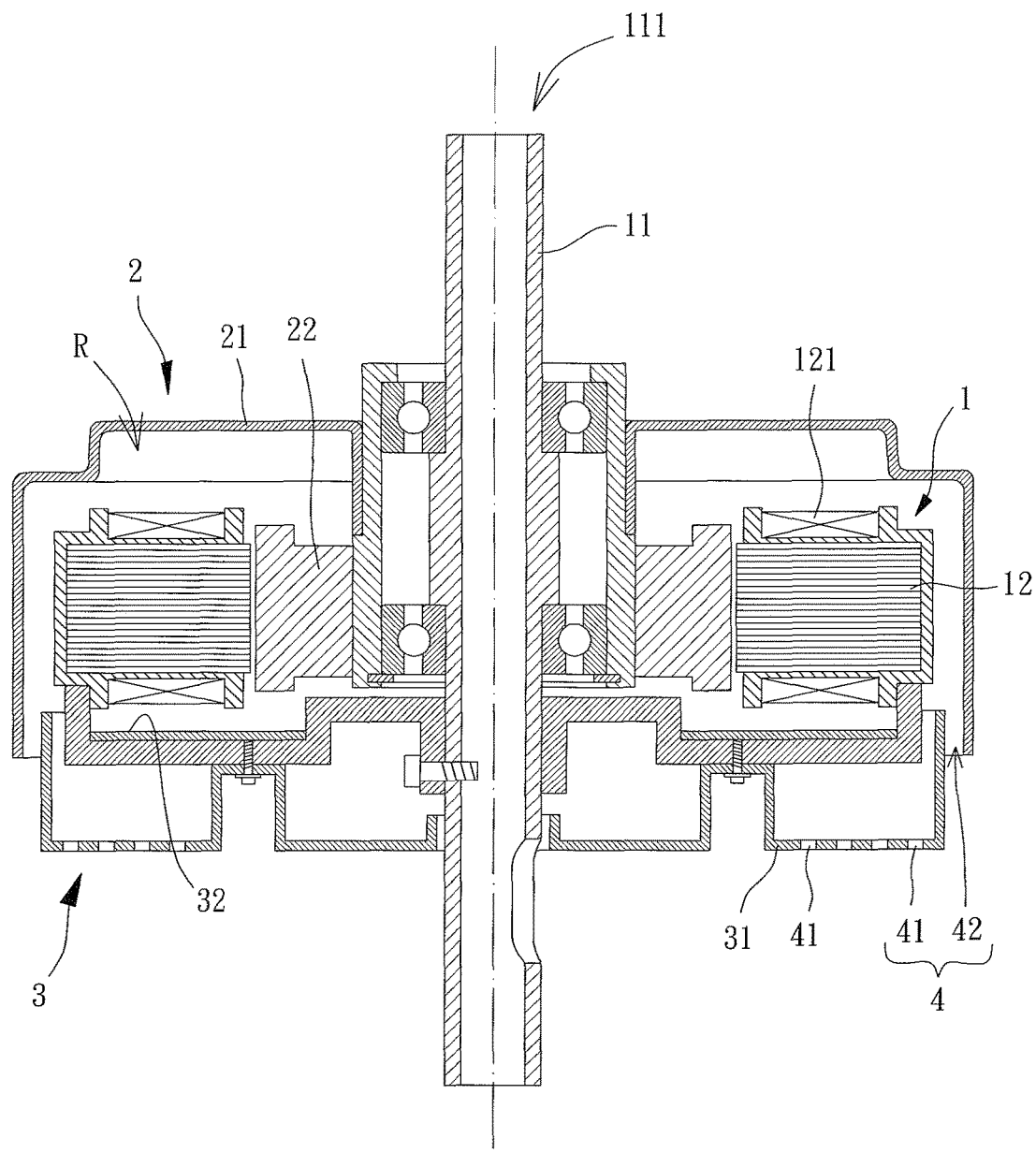
FIG. 5 is a cross-sectional view of the motor according to the third embodiment.

Referring to FIG. 5, a third embodiment of a motor of a ceiling fan of the present disclosure is shown. In comparison with the first embodiment, this motor is an inner-rotor-type motor. The permanent magnet module 22 of the rotor 2 is rotatably coupled with the shaft 11, the first housing 21 connects with the permanent magnet module 22 directly or indirectly, the core 12 is still firmly mounted on the shaft 11, and the permanent magnet module 22 has a plurality of pole faces facing and spaced from the core 12 by a gap. Accordingly, it is shown that an inner-rotor-type motor can really serve as the present motor of a ceiling fan.

Based on the structures discussed above, the motors of the first, second and third embodiments are characterized as follows. Since the core 12 of the stator 1 is arranged between the first housing 21 of the rotor 2 and the second housing 31 of the base 3, the second housing 31 is directly or indirectly coupled with the stator 1. Moreover, the motor further includes an air channel 4 communicating the interior and the exterior of the motor. The air channel 4 could include a through hole 41, 41' formed in the first or second housings 21, 31 or a gap 42 between the first and second housings 21, 31. Since the first housing 21 of the rotor 2 is able to rotate about the shaft 11 of the stator 1 in operation and since the rotation of the first housing 21 is relative to the second housing 31 that is firmly connected to the stator 1, it is easy to generate air current inside the motor for cooling purposes and to dispel the heat via the air channel 4.

Since the conventional ceiling fan 9 has the upper shield 921, the lower shield 922 and the waist ring 923 sealing the stator 91 jointly, it is difficult to dispel the heat generated by the core 912 and coils 913 during the operation of the stator 91. In contrast with the conventional ceiling fan 9, the core 12 of the stator 1 of the embodiments of the present invention is arranged between the first housing 21 of the rotor 2 and the second housing 31 of the base 3, and the motor includes the air channel 4 communicating the interior and exterior of the motor. Therefore, the heat generated by the motor of the ceiling fan can be dispelled via the air channel 4, and, thus, the motor of the ceiling fan of the present invention can improve the cooling performance, lower the operational currents, and have a longer service life.

Besides, the first housing 21 is rotatably coupled with the shaft 11, and the second housing 31 is firmly connected with the stator 1. Since rotation of the first housing 21 is relative to the second housing 31 that is firmly connected to the stator 1, it is easy to generate air current inside the motor for cooling the core 12, the coil 121 and the circuit board 32. Since the upper shield 921, the lower shield 922 and the waist ring 923 of the conventional ceiling fan 9 rotate simultaneously, it is almost impossible to generate airflows in the motor 9 for air inside and outside the rotor 92 to exchange. Thus, in contrast with the conventional ceiling fan 9, the motor of the ceiling fan of the present disclosure can further improve the cooling performance for internal components of the motor. Furthermore, even though the circuit board 32 is received in the space enclosed by the first and second housings 21, 31, the heat generated by the circuit board 32 does not affect the operation of the motor, since the air current generated inside the motor can efficiently bring the heat out of the motor. In contrast with the conventional ceiling fan 9 that requires the housing 932 for receiving the circuit board 931 in order to arrange the circuit board 931 outside of the stator 91 and the rotor 92, the motor of the ceiling fan of the present invention can reduce the size thereof.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor of a ceiling fan, comprising:
   a stator having a shaft and a core, wherein the shaft extends in an axial direction;
   a rotor having a first housing rotatably coupling with the shaft, wherein the first housing has a first peripheral portion extending in the axial direction and surrounding the shaft, wherein the first peripheral portion is spaced from the shaft in a radial direction perpendicular to the axial direction; and
   a base having a second housing firmly connecting with the stator, wherein the second housing has a second peripheral portion extending in the axial direction and surrounding the shaft, wherein the second peripheral portion is spaced from the shaft in the radial direction and is located radially inward of the first peripheral portion of the first housing,
   wherein the core of the stator is positioned between the first and second housings, wherein an air channel communicates an inside and an outside of the motor, wherein the first peripheral portion of first housing partially overlaps with the second peripheral portion of the second housing in the axial direction and is spaced from the second peripheral portion of the second housing by a gap in the radial direction, wherein the gap communicates the inside and the outside of the motor, wherein the air channel includes the gap, and wherein the first housing is rotatable relative to the second housing for generating an air current inside the motor and guiding the air current out of the motor via the air channel.

2. The motor of the ceiling fan as claimed in claim 1, wherein the second housing further includes a wall extending perpendicularly to the axial direction, wherein the second peripheral portion of the second housing extends from the wall of the second housing in the axial direction, wherein the air channel further has a through hole in the wall of the second housing of the base, and wherein the through hole penetrates the second housing to communicate the inside and the outside of the motor.

3. The motor of the ceiling fan as claimed in claim 1, wherein a circuit board is disposed inside the second housing corresponding to an axial extent of the first peripheral portion at the gap.

4. The motor of the ceiling fan as claimed in claim 3, wherein the first housing has an inner room inside for receiving the core, with the core being intermediate the circuit board and the first housing.

5. The motor of the ceiling fan as claimed in claim 4, wherein a permanent magnet module is mounted in and coupled with the first housing, and wherein the permanent magnet module is received in the inner room and has a pole face facing the core.

6. The motor of the ceiling fan as claimed in claim 4, wherein a blade is bent at an acute angle to an inner surface of the first housing, and wherein the inner surface faces the inner room and the blade extends into the inner room, with the blade and the housing at the inner surface formed as a single piece of a constant thickness.

7. The motor of the ceiling fan as claimed in claim 4, wherein the first housing further includes a wall extending perpendicular to the axial direction, wherein the first peripheral portion of the first housing extends from the wall of the first housing in the axial direction, wherein the air channel further has a through hole in the wall of the first housing of the rotor, and wherein the through hole penetrates the first housing to communicate the inside and the outside of the motor.

8. The motor of the ceiling fan as claimed in claim 7, wherein a blade is bent at an acute angle from the wall of the first housing and connects with an edge of the through hole, with the blade and the wall integrally formed as a single piece of a constant thickness.

9. The motor of the ceiling fan as claimed in claim 1, wherein the core firmly couples with the shaft.

* * * * *